June 7, 1927.
W. M. SCOTT ET AL
1,631,606
CASING FOR ELECTRICAL MEASURING INSTRUMENTS
Filed Jan. 7, 1922        2 Sheets-Sheet 1
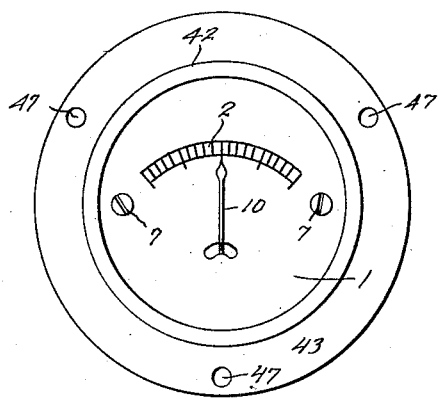
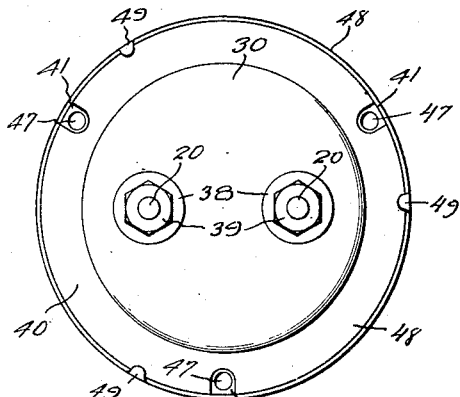
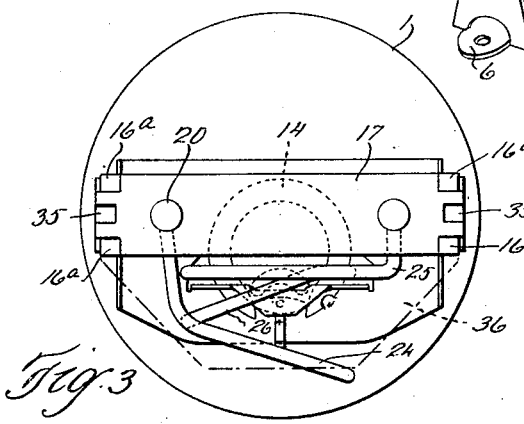
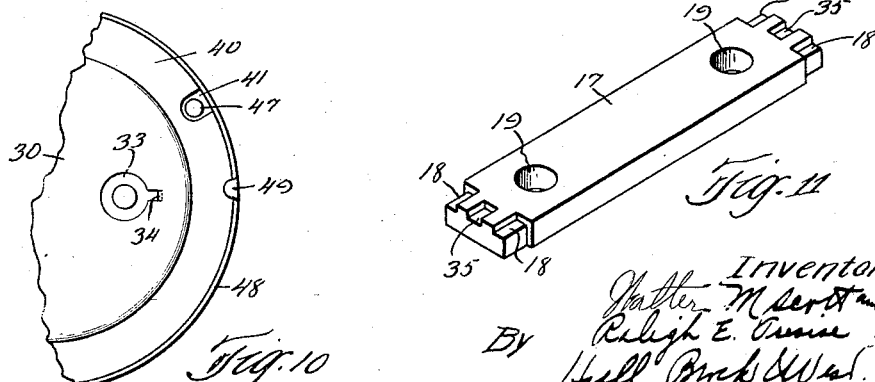
Inventors

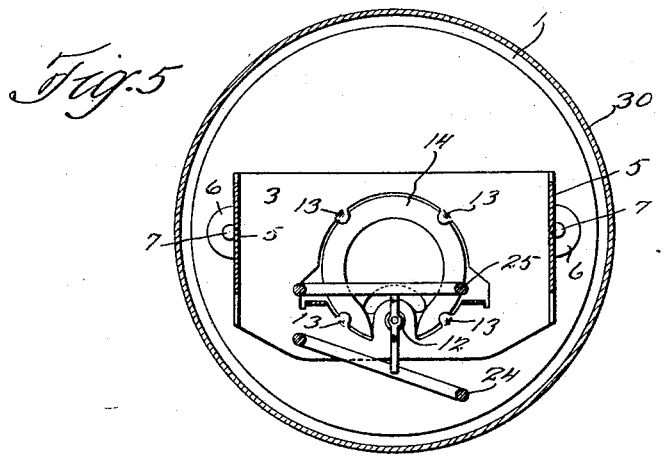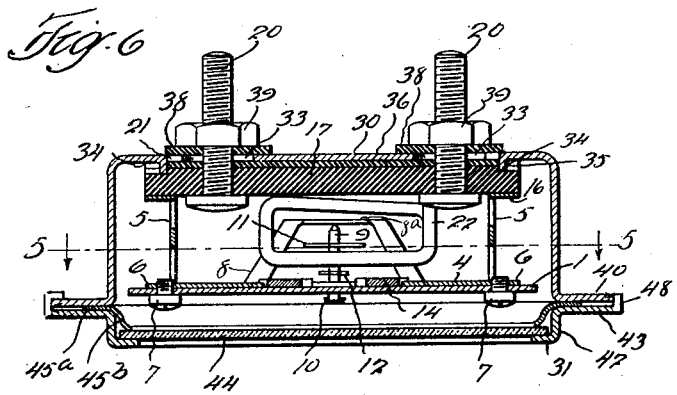

Patented June 7, 1927.

1,631,606

UNITED STATES PATENT OFFICE.

WALTER M. SCOTT, OF LAKEWOOD, AND RALEIGH E. TRESISE, OF CLEVELAND, OHIO.

CASING FOR ELECTRICAL MEASURING INSTRUMENTS.

Application filed January 7, 1922. Serial No. 527,552.

This invention relates to electrical measuring instruments and has particular reference to an ammeter of the type used on self propelled vehicles for indicating the rate of flow of current to and from the starting and lighting battery.

The principal object of the present invention is to provide an instrument of this character which shall consist of a minimum number of parts which are simple in construction, inexpensive to manufacture and easily and quickly assembled.

Another object is to provide an instrument of this character which shall be rugged and capable of withstanding the extreme vibrations to which such instruments are subjected and yet be capable of indicating accurately the rate of current flow to and from the battery.

A still further object is to provide an ammeter which shall be so constructed and assembled as to reduce to a minimum the possibility of incurring a short circuit therein.

With these various objects in view and others which will become apparent as the description proceeds, the invention consists in the novel features of construction and in the manner of combining or arranging the same, all of which will be fully described hereinafter and pointed out in the appended claims.

The present application is, in some respects, a continuation in part of our application Serial Number 213,854, filed January 26, 1918.

In the accompanying drawings, Figs. 1 and 2 are front and rear elevations, respectively, of our improved ammeter; Fig. 3 is a rear elevation of the assembled operating mechanism therefor removed from the casing; Fig. 4 is a side elevation of the parts shown in Fig. 3; Fig. 5 is a sectional view taken on the line 5—5 of Fig. 6; Fig. 6 is a central transverse sectional view through the instrument shown in Figs. 1 and 2; Fig. 7 is a perspective view of one of the elements entering into the construction of the instrument; Fig. 8 is a top plan view and Fig. 9 is a side elevation of the glass-retaining ring; Fig. 10 is a fragmentary elevation of the rear of the instrument, showing one of the features of construction thereof; Fig. 11 is a perspective view of the insulating bridge entering into the construction of our instrument; Fig. 12 is a perspective view of a supporting member forming part thereof.

Describing by reference characters the various parts illustrated, 1 indicates a circular dial which is preferably formed from sheet metal and provided on one face thereof with a calibrated scale, indicated at 2. Secured to this dial, on the rear side thereof, is a sheet metal supporting member 3 which is shown in detail in Fig. 12. This supporting member comprises a base 4 having an arm 5 projecting upwardly therefrom at each end. Each arm is provided with an ear 6 stamped therefrom, said ears lying in the plane of the base 4 and receiving screws 7 which fasten the supporting member to the dial, the dial constituting a base for said member. A support 8 is struck up from the base 4, the upper portion of said support being bent over parallel with the base, as shown at 8ª, the base and the part 8ª serving to receive and pivotally support the staff 9 of an indicating needle 10. The staff 9 has mounted thereon an armature 11 and a damping device 12, said damping device being located in or adjacent to a point of high concentration of a permanent magnet field which tends to resist rapid and vibratory movement of the needle and the armature 11 being spaced from said damping device and located in the maximum field of a current coil to be referred to hereinafter. The opening in the base, formed by punching the needle support therefrom is enlarged slightly and is provided about its periphery with a plurality of clips 13 enabling the permanent magnet 14 to be inserted into said opening from the under side of the base and to be retained in position by the clips 13, when the parts are assembled.

The upper end of each arm 5 is bent over parallel with the base to form a shelf 16, which shelves receive an insulating bridge 17, the ends 16ª of each shelf being bent upwardly and inwardly to form clips entering recesses 18 formed in the said bridge (see Figs. 3, 11 and 12) thereby to secure said bridge to the said arms. The insulating bridge is provided with two apertures 19 arranged in spaced relationship and adapted to receive terminal screws 20. These screws serve as terminals for the meter and the ends of a current coil 22 are connected thereto in any suitable manner, as by soldering.

The current coil preferably consists of a convolution 24 and a convolution 25 spaced apart and connected by an intermediate portion 26, the convolutions 24 and 25 being spaced apart and arranged substantially as shown. It will be noted that the permanent magnet 14, current coil 22, and the movable system comprising the staff 9, needle 10, armature 11 and damping device 12 are grouped and arranged so that the current coil lies wholly to one side of the permanent magnet with its field parallel to the magnet face and substantially perpendicular to a line joining the magnet poles. Also the staff 9 is mounted so as to intersect the current coil and its axis is perpendicular to the field of said coil and to the plane of the magnet. This arrangement as previously stated, positions the damping device 12 between or adjacent the magnet poles, or in or adjacent the point of high concentration of the permanent field, and also positions the armature 11 in the maximum field of the current coil and out of the maximum field of the permanent magnet, which causes a more nearly equal effect by the two fields than has heretofore been accomplished in instruments of this type, and a more uniform scale is obtainable together with remarkable accuracy.

The dial, supporting member, and associated parts, forming an assembly such as shown in Figs. 3 and 4, are next placed in a casing. This casing is composed of a rear portion 30 and a front portion 31 having a transparent pane positioned therein. The rear portion 30 is provided with two enlarged apertures 33 through which the terminal screws 20 project loosely, and an inwardly directed tongue 34 is punched from the casing adjacent to and intersecting the periphery of each aperture 33. The tongues 34 are adapted to enter aligning recesses 35, 35 in the insulating bridge (Fig. 11) as clearly shown in Fig. 6, and thus position the terminals 20 centrally with respect to the apertures 33. This arrangement also prevents the movement of the terminals with respect to the casing and hence prevents the rear portion of the casing from contacting electrically with the assembly positioned therein, due to the large air gap provided around each terminal.

Before the assembly is positioned in the rear portion of the casing, an apron 36 (Fig. 7) of insulating material is slipped over the terminals 20 and into contact with the insulating bridge, having apertures 36ª for the reception of said terminals, and end recesses 36ᵇ for the reception of the tongues 34. This apron makes "shorting" impossible between the clips 16ª and the casing and between the coil and the casing, even should the coil become displaced, as by violent treatment, or by overheating, in such a manner as to touch the base or (but for such apron) to touch the back of the casing. When the complete assembly has been positioned in the rear portion of the casing, and the tongues 34 are entered in the recesses 36ᵇ and 35, as previously described, then an insulating washer 38 is slipped over each terminal and into contact with the casing, after which a nut 39 is applied to each terminal to draw the parts up tightly.

The rear portion of the casing is provided adjacent its front edge with a flange 40 and this flange has formed therein a plurality of apertures 41 which extend outwardly to and intersect the outer edge of said flange, as shown in Figs. 2 and 10.

The front portion of the casing consists essentially of an annular ring comprising an inner annular seat 42 from which extends a flange 43. The seat 42 is adapted to receive a transparent pane 44 therein and this pane is retained by a spring washer 45 (Figs. 8 and 9) interposed between the front and rear portions of the casing and having an external annular flange 45ª adapted to be seated between the flanges 40 and 42 and an internal flange 45ᵇ projecting therefrom and contacting with the periphery of said pane, as shown in Fig. 6. In this manner the pane is held securely and prevented from rattling and is easily removed and replaced. The flange 43 is provided with a plurality of apertures 47 which are adapted to align with the apertures 41 formed in the flange 40 when the device is completely assembled. The peripheral edge of the flange 43 is rolled over, as indicated at 48, and this edge is provided with a plurality of clips 49.

In assembling the front and rear portions of the casing, the pane is first inserted in the seat 42 from the rear side, then the spring washer 45 is placed in contact with the pane. The rear portion of the casing containing the meter assembly is then placed in contact with the front portion of the casing so that the clips 49 are in alignment with the apertures 41, which permits the flange 40 to be seated flush with the rolled edge of flange 43. By rotating the rear portion of the casing with respect to the front portion thereof, the clips 49 will ride along the peripheral edge of the flange 40 and secure the parts together. This rotation is continued until the apertures 41 and 47, in their respective flanges, are brought into alignment to permit a screw or bolt to be inserted through each to fasten the device in position on the instrument board or other mounting.

Having thus described our invention, what we claim is:

1. In an instrument of the character set forth, the combination, with a casing member having a peripheral flange formed with an aperture therein, of a seating member having a peripheral flange resting on the first mentioned flange and having within said flanges a yielding seat, a pane on said seat, and a clamping member having an inner seat for said pane and a peripheral flange located externally of said seat, the peripheral flange of said clamping member being formed with an aperture therein, the outer edge of the last mentioned flange being laterally extended to embrace the peripheral edge of the first mentioned flange and being provided with a plurality of projections formed upon such lateral extension adapted to enter correspondingly located slots in the edge of the first mentioned flange, thereby to permit the first mentioned member and the clamping member to be secured together by relative rotary movement therebetween and bring said apertures in alignment to permit a fastening element to be inserted therethrough.

2. In an instrument of the class described, the combination, with a casing member having a peripheral flange, of a seating member having a peripheral flange resting on the first mentioned peripheral flange and provided with an interior seat, a pane on said seat, and a clamping member having an interior flange engaging the outer peripheral portion of said pane and an exterior flange having its peripheral edge rolled over to engage said first mentioned flange to secure said seating member to said casing member.

3. In an instrument of the class described, the combination, with a casing member having a peripheral flange having a plurality of spaced slots therein, a seating member having a flange resting on said peripheral flange and provided with an interior seat, a pane on said seat, and a clamping member having an interior seat for the peripheral portion of said pane, said clamping member being provided with a plurality of apertures adapted to be aligned with said slots in said casing member whereby to receive a screw for securing said casing member and clamping member together, the outer peripheral edge of said clamping member having a plurality of projections thereon bent over and adapted to enter said slots and to engage said first mentioned flange upon relative rotary movement of said members.

4. In an instrument of the class described, the combination, with a casing comprising two members, each having a peripheral flange, one of said flanges having a plurality of slots therein and the other of said members having a plurality of apertures therein adapted to be aligned with said slots, said last mentioned member having its peripheral edge rolled over to embrace the edge of said first mentioned flange and a plurality of projections formed on said rolled edge and adapted to enter said slots and to engage the first mentioned flange through relative rotary movement of said members, whereby to secure said members together.

5. In an instrument of the class described, the combination with a casing member having a peripheral flange provided with a plurality of spaced slots extending to and including the edge thereof, a clamping member having an external peripheral flange provided with spaced apertures therein adapted to be aligned with said slots, said last mentioned flange being rolled over to embrace the edge of said first mentioned flange, and a plurality of projections formed on such rolled edge adapted to enter said slots and to engage the first mentioned flange through relative rotary movement of said members whereby to secure said members together.

6. A casing for an instrument of the character set forth comprising two members, the abutting edges of each of said members being provided each with a flange and each of said flanges being provided with a plurality of apertures, the apertures in one of said flanges being adapted to align with the apertures in the other of said flanges, a plurality of projections formed on one of said flanges, the other of said flanges having a plurality of notches therein extending to and including the edge thereof, said projections being adapted to enter the last mentioned notches and engage the other flange through relative rotary movement of said members whereby to fasten said members together and bring the first mentioned notches in alignment whereby to receive means for preventing relative rotation of said members.

7. In an instrument of the class described, the combination of a casing having an annular peripheral flange, of a seating member having a portion resting on said peripheral flange and adapted to form a seat for a glass pane, of a clamping member having an interior flange engaging the outer peripheral portion of said pane and an exterior flange projecting over and cooperating with the peripheral flange on said casing to secure said pane to said casing, said last mentioned peripheral flange having its peripheral edge rolled over to embrace the edge of said first mentioned flange, said first mentioned flange having a plurality of notches in its edge and said rolled over edge having a plurality of projections thereon bent so as to enter said notches and to engage the rear side of said first mentioned flange through relative rotary movement of said casing and clamping member.

In testimony whereof, we hereunto affix our signatures.

WALTER M. SCOTT.
RALEIGH E. TRESISE.